US012135122B2

(12) United States Patent
Wessner et al.

(10) Patent No.: US 12,135,122 B2
(45) Date of Patent: Nov. 5, 2024

(54) GRADE LIGHT FIXTURE AND SUBASSEMBLIES THEREOF

(71) Applicant: SIGNIFY HOLDING B.V., Eindhoven (NL)

(72) Inventors: Zachary Robert Wessner, Salem, NH (US); Raymond Andrew Debruin, Merrimack, NH (US); Bradford Thomas Kolsky, Wakefield, MA (US); James William Preston, Westford, MA (US); Robert Wilson Timmerman, Billerica, MA (US); Eric Anthony Roth, Brookline, NH (US)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/329,660

(22) Filed: Jun. 6, 2023

(65) Prior Publication Data

US 2023/0341119 A1 Oct. 26, 2023

Related U.S. Application Data

(63) Continuation of application No. 17/610,622, filed as application No. PCT/EP2020/063126 on May 12, 2020, now Pat. No. 11,708,969.

(Continued)

(51) Int. Cl.

*F21V 29/71* (2015.01)
*F21S 8/02* (2006.01)

(Continued)

(52) U.S. Cl.

CPC ............ *F21V 29/713* (2015.01); *F21S 8/022* (2013.01); *F21V 29/73* (2015.01); *F21V 31/005* (2013.01); *F21V 31/03* (2013.01); *F21Y 2115/10* (2016.08)

(58) Field of Classification Search

CPC ...... F21V 29/713; F21V 29/73; F21V 31/005; F21V 31/03; F21V 23/06; F21S 8/022; F21Y 2115/10

See application file for complete search history.

(56) References Cited

U.S. PATENT DOCUMENTS

| | | | | |
|---|---|---|---|---|
| 5,481,443 A * | 1/1996 | Wagner | F21V 21/30 | 362/372 |
| 5,513,085 A * | 4/1996 | Bourne | F21S 8/028 | 362/386 |

(Continued)

FOREIGN PATENT DOCUMENTS

| | | |
|---|---|---|
| CN | 201652246 U | 11/2010 |
| IN | 108224257 A | 6/2018 |

(Continued)

OTHER PUBLICATIONS https://www/lumenpulse.com/files/view-files/supportfiles/c4b3ba5d7de0ef3664ca3947898354/3422/locale_file/138032-lumenpulse-lumenbeam-inground-lbil-installation-instructions.pdf.

*Primary Examiner* — Tsion Tumebo

(57) ABSTRACT

The present disclosure is directed to in grade light fixtures and recessed luminaires and subassemblies thereof, including, for example, a heat sink and pivot for a recessed luminaire, a gasket for the recessed luminaire, and an outer box and cover for installation of the recessed luminaire. The recessed luminaire comprises: a housing having an internal surface; and a light subassembly engaged with a thermally conductive body, the light subassembly having a first end and a second end, wherein the first end of the light subassembly is pivotally secured to a pivot arranged on, in, or proximate to the internal surface of the housing. The thermally conductive body is in thermal contact with the internal surface of the housing. The recessed luminaire further comprises a dehumidifier.

10 Claims, 15 Drawing Sheets

Related U.S. Application Data

(60) Provisional application No. 62/961,413, filed on Jan. 15, 2020, provisional application No. 62/849,342, filed on May 17, 2019.

(51) Int. Cl.

| | |
|---|---|
| ***F21V 29/73*** | (2015.01) |
| ***F21V 31/00*** | (2006.01) |
| ***F21V 31/03*** | (2006.01) |
| ***F21Y 115/10*** | (2016.01) |

(56) References Cited

U.S. PATENT DOCUMENTS

| | | | | | |
|---|---|---|---|---|---|
| 5,908,236 | A | 6/1999 | Lueken et al. | | |
| 6,502,967 | B2 | 1/2003 | Mullen | | |
| 7,305,929 | B2 * | 12/2007 | MacDonald | B63B 45/02 | 362/267 |
| 7,320,533 | B1 * | 1/2008 | Beadle | F21V 9/00 | 362/427 |
| 7,476,008 | B2 | 1/2009 | Kay | | |
| 7,524,078 | B1 * | 4/2009 | Pressel | F21S 8/022 | 362/374 |
| 7,874,709 | B1 * | 1/2011 | Beadle | F21S 8/022 | 362/427 |
| 2004/0246709 | A1 | 12/2004 | Hagen | | |
| 2007/0137544 | A1 * | 6/2007 | MacDonald | B63C 11/49 | 114/173 |
| 2008/0186717 | A1 | 8/2008 | Ruberg | | |
| 2016/0334082 | A1 * | 11/2016 | Chen | G08B 13/19695 | |
| 2016/0377280 | A1 * | 12/2016 | Acampora | F21S 8/022 | 362/294 |
| 2017/0219188 | A1 | 8/2017 | Veloskey | | |

FOREIGN PATENT DOCUMENTS

| | | | |
|---|---|---|---|
| KR | 101250913 | B1 | 4/2013 |
| WO | 2009070759 | A1 | 6/2009 |
| WO | 2010009665 | A1 | 1/2010 |
| WO | 2012103484 | A2 | 8/2012 |
| WO | 2016179216 | A1 | 11/2016 |

* cited by examiner

GRADE LIGHT FIXTURE AND SUBASSEMBLIES THEREOF

CROSS-REFERENCE TO PRIOR APPLICATIONS

The present application is a continuation application of and claims priority to U.S. application Ser. No. 17/610,622 filed on Nov. 11, 2021, which is the U.S. National Phase application under 35 U.S.C. § 371 of International Application No. PCT/EP2020/063126, filed on May 12, 2020, which claims the benefit of U.S. Provisional Application No. 62/961,413, filed on Jan. 15, 2020, and U.S. Provisional Application No. 62/849,342, filed on May 17, 2019. These applications are hereby incorporated by reference herein.

FIELD OF THE INVENTION

The present disclosure is generally directed to in grade (in-ground) light fixtures and recessed luminaires and subassemblies thereof.

BACKGROUND

Known in grade light fixtures and recessed luminaires, which are usually flush with the surrounding ground level, have a number of disadvantages and drawbacks. For example, in grade light fixtures often have tilt mechanisms, however, these mechanisms are typically located on center. This forces the LED board to be further away from the lens to create room for the tilting LED board. Also, because in grade lighting fixtures are installed in the ground, these fixtures can be driven over with vehicles, which puts a great amount of force onto the lens of the fixture. The force is then transferred to the gasket in most designs. This high force can damage gaskets and cause water ingress failures through repetitive loading.

Further, in-grade lighting fixtures typically require a multi-stage installation sequence, including installing an outer box with a conduit to house the light fixture and power the light fixture, backfilling around the outer box with gravel, dirt, or concrete, and installing the light fixture inside of the outer box. For this reason, many in-grade light fixtures are sold with a temporary removable installation cover. The purpose of this cover is to cover the top opening of the outer box so that during the backfill step it is not filled in with dirt. Often times the cables originating from the conduit are left unconnected inside the outer box for periods of time before the light fixture is installed into the outer box. During this time, a temporary installation cover may be used to cap the top of the outer box to prevent dirt, water, or other objects including people from entering the open hole. However, ground water, dirt, insects, etc. can still contaminate the open ends of the cable connectors if they are left unconnected inside the outer box during this time. This can lead to water ingress issues and corrosion over time and cause failures.

Additionally, in grade light fixtures are exposed to high levels of moisture when they are installed in ground. This moisture, as well as trapped air around the fixture, prevents the use of traditional condensation mitigation strategies, such as venting. Venting is used with LED lights to equalize the pressure and humidity between the inside of the enclosure and the outside environment. Typically, condensation events do not occur or last very long in above grade lights with vents installed. However, in grade fixtures with vents have moisture accumulate inside the enclosure when vents are used. The vents allow the moisture to enter in the form of water vapor (humidity). Because of their in grade application, this moisture tends to remain in the enclosure instead of going out over time. There are other ways to prevent condensation such as sealing the enclosure (without vents), using a desiccant to adsorb the internal moisture, using an internal heater to keep the inside of the enclosure above the dew point which have drawbacks. Without a vent, pressure cannot equalize between the inside and outside, which puts stress on the seals. Desiccants can only adsorb so much moisture before they become saturated. Using heaters by themselves to reduce humidity becomes ineffective when the product has hit its thermal limit and the dew point is below the thermal limit of the product.

SUMMARY OF THE INVENTION

There is a continued need for improvements to in grade light fixtures and recessed luminaires. The present disclosure is directed to inventive in-grade light fixtures and recessed luminaires and subassemblies thereof, and more specifically, but not exclusively, to in grade light fixtures including a heat sink and pivot for a light subassembly of the light fixture, a gasket for the cover of the light fixture, and an installation cover for an outer box for installation of the light fixture. The recessed luminaire comprises a heat sink in contact with a light subassembly and a pivot on a side of the heat sink which provides a conduction path through the housing of the luminaire. The gasket has a plurality of components which allow the cover of the in grade light fixture to receive force without breaking the seal between the cover and the housing of the recessed luminaire. An outer box used during installation of the recessed luminaire has an installation cover having connectors for electric cable for installing the recessed luminaire. The connectors secure and protect the cable.

Generally, in one aspect, a recessed luminaire is provided. The recessed luminaire comprises: a housing having an internal surface; and a light subassembly having a first end and a second end, wherein the first end is pivotally secured to a pivot arranged on, in, or proximate to the internal surface of the housing.

In an aspect, the recessed luminaire further comprises a thermally conductive body engaged with the light subassembly, the thermally conductive body having a first end and a second end, wherein the thermally conductive body is in thermal contact with the internal surface of the housing.

In an aspect, the recessed luminaire further comprises a cover of the housing, wherein the pivot is located at a first distance away from the cover of the housing, wherein the light subassembly engaged with a thermally conductive body rotates a first rotational amount in a first rotational direction with respect to a first imaginary horizontal plane through the pivot and substantially parallel with the cover of the housing and a second rotational amount in a second rotational direction with respect to the first imaginary horizontal plane.

In an aspect, the recessed luminaire further comprises a gear plate non-rotatably secured to at least a portion of the thermally conductive body, the gear plate comprising a first set of gear teeth.

In an aspect, the recessed luminaire further comprises a lever comprising a first lever portion and a second lever portion non-rotatably connected, the first lever portion and the second lever portion arranged to pivot about a lever pivot point, wherein the second lever portion has a second set of gear teeth, wherein at least a portion of the second set of gear teeth are arranged to engage with at least a portion of the first set of gear teeth.

In an aspect, a first end of the first lever portion extends outside the housing of the recessed luminaire and is arranged to move within a channel of a securement plate from a first end of the channel to a second end of the channel, wherein the recessed luminaire further comprises a locking mechanism, wherein the locking mechanism is arranged to secure the first end of the lever portion to the securement plate at the first end of the channel, at the second end of the channel, or at an intermediate position between the first end and the second end.

Generally, in one aspect, an outer box assembly for installation of a luminaire is provided. The outer box assembly comprises: an outer box having a cavity, the outer box arranged to receive the recessed luminaire; an installation cover having an interior surface, the installation cover arranged to cover the cavity of the outer box; and one or more connectors arranged on the interior surface of the installation cover, wherein the one or more connectors are arranged to receive one or more cables to allow the cables to connect to the installation cover.

In an aspect, the cable is arranged to connect to the installation cover at the one or more connectors or to the recessed luminaire at one or more luminaire cable connectors of the luminaire.

In an aspect, the recessed luminaire further comprises an electric power source arranged to provide power to the one or more connectors on the installation cover.

In an aspect, the recessed luminaire arranged within the cavity of the outer box is arranged to sit flush with the ground.

In an aspect, the installation cover is arranged to seal the cavity of the outer box from dirt and moisture.

Generally, in one aspect, a gasket for a luminaire is provided. The gasket comprises: a first surface in contact with a cover of the luminaire; a second surface in contact with a housing of the luminaire, wherein the housing comprises a first portion having a first height and a second portion having a second height, wherein the second height is less than the first height, wherein the first portion of the housing and the second portion of the housing are adjacent to the gasket, and wherein the second portion of the housing or the second surface of the gasket have an indentation.

In an aspect, the gasket further comprises a first vertical component substantially perpendicular to a reference surface, the first vertical portion having a first end and a second end; a first horizontal component substantially parallel to the reference surface, the first horizontal portion having a third end and a fourth end, the third end integrally connected to the second end of the first vertical component; a second vertical component substantially perpendicular to the reference surface, the second vertical portion component having a fifth end and a sixth end, the fifth end integrally connected to the fourth end of the first horizontal component; and a second horizontal component substantially parallel to the reference surface, the second horizontal portion having a seventh end and an eight end, the seventh end integrally connected to the sixth end of the second vertical component, wherein the first vertical component, the first horizontal component, the second vertical component, and the second horizontal component are annular about and arranged about a cover of a light unit.

In an aspect, the gasket further comprises sealing bumps arranged on a first external surface of the second horizontal component of the gasket.

In an aspect, the gasket further comprises an indentation on the second horizontal component, wherein the second horizontal component further comprises a first portion having a first height and a second portion having a second height, wherein the second height is less than the first height.

Generally, in one aspect, a recessed luminaire is provided. The recessed luminaire comprises: a housing having a glass cover, wherein the recessed luminaire is arranged to be installed below ground; a dehumidifier having a first surface on the interior of the housing and a second surface on the exterior of the housing; and a humidity sensor arranged on, within, or in proximity to the housing, wherein the humidity sensor is configured to provide a feedback loop to the dehumidifier for maintaining internal relative humidity.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present disclosure is directed to in grade light fixtures and recessed luminaires and subassemblies thereof, and more specifically, but not exclusively, to in grade light fixtures including a heat sink and pivot for a light subassembly of the light fixture, a gasket for the cover of the light fixture, an installation cover for an outer box for installation of the light fixture. The recessed luminaire comprises a heat sink in contact with a light subassembly and a pivot on a side of the heat sink which provides a conduction path through the housing of the luminaire. The gasket has a plurality of components which allow the cover of the in grade light fixture to receive force without breaking the seal between the cover and the housing of the recessed luminaire. An outer box used during installation of the recessed luminaire has an installation cover having connectors for electric cable for installing the recessed luminaire. The connectors secure and protect the cable. Additional features and advantages of the inventive in grade light fixtures and recessed luminaires and subassemblies thereof are disclosed herein.

Figure 1:
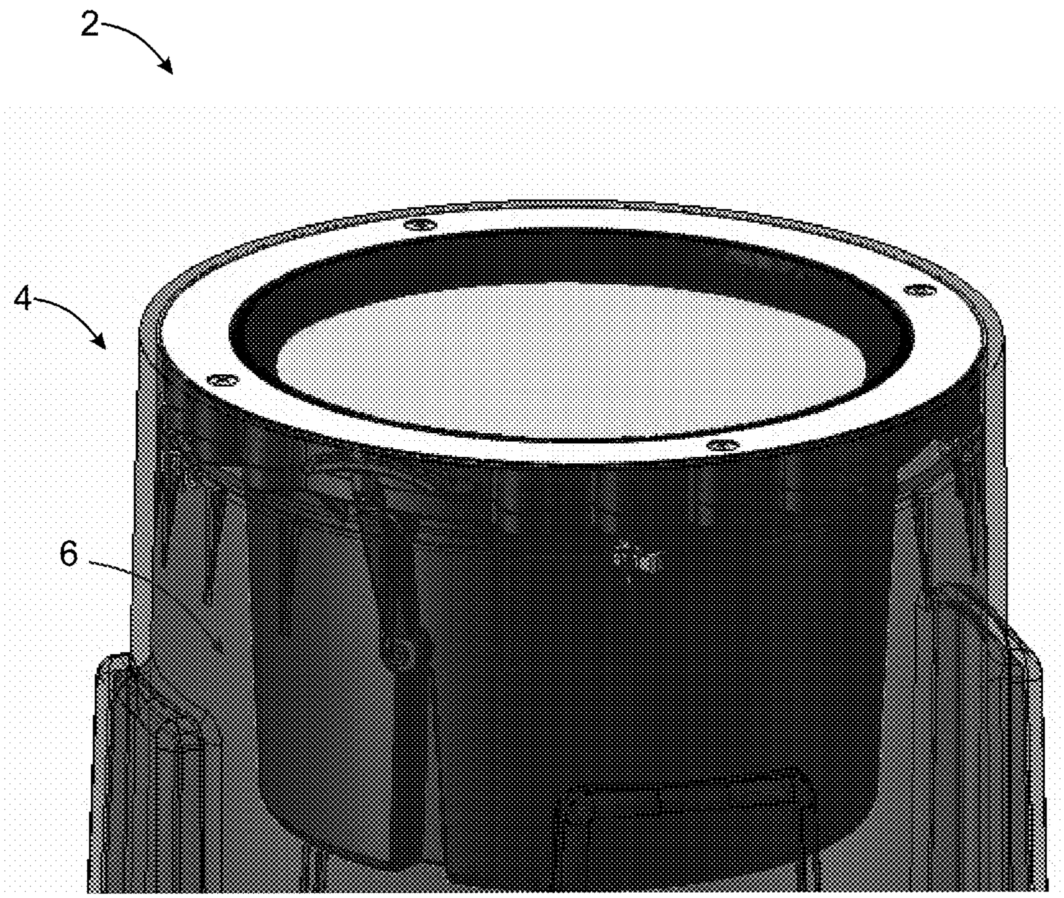
FIG. 1 is a recessed luminaire according to aspects of the present disclosure.
Figure 2:
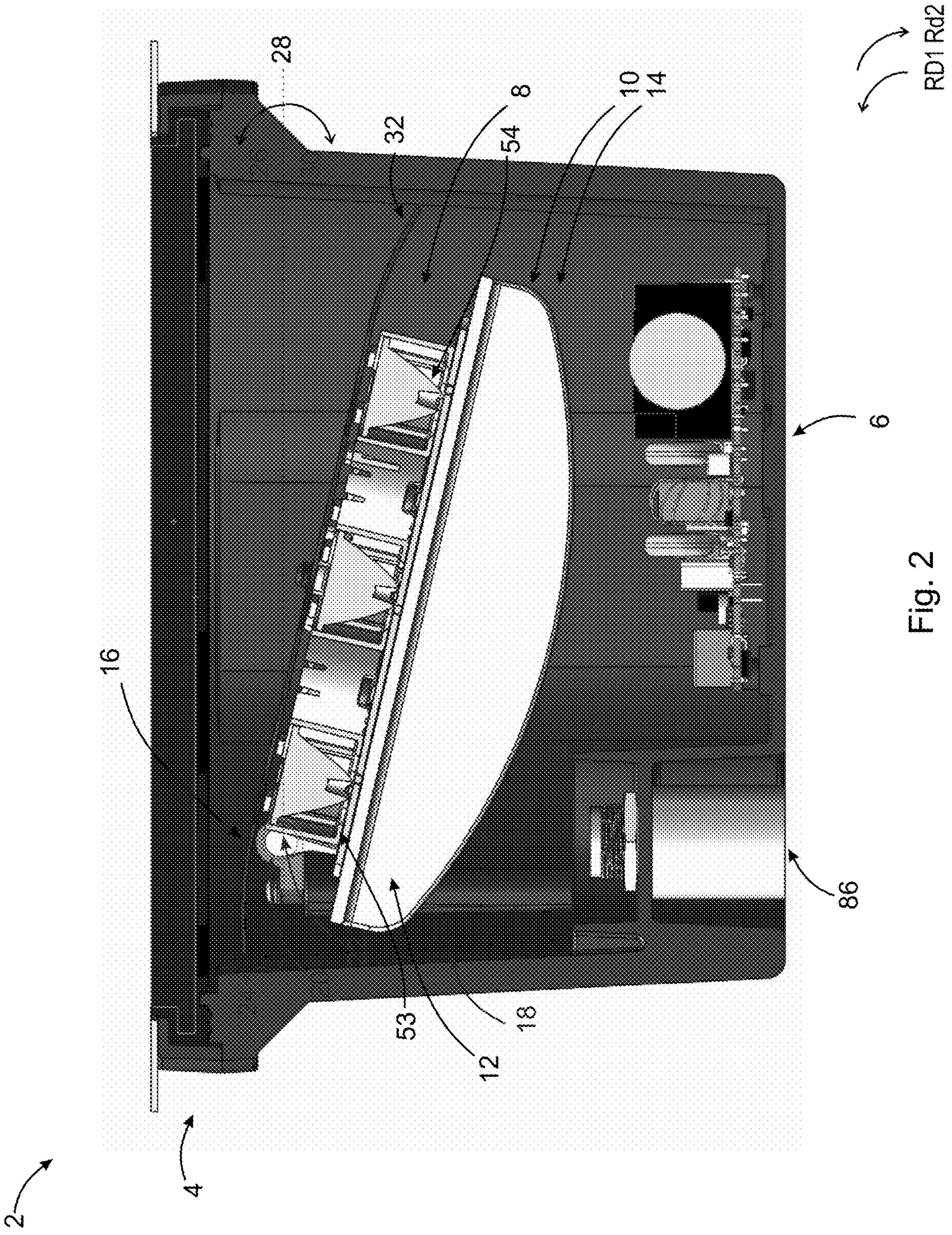
FIG. 2 is a cross-sectional view of a recessed luminaire according to aspects of the present disclosure.
Figure 3:
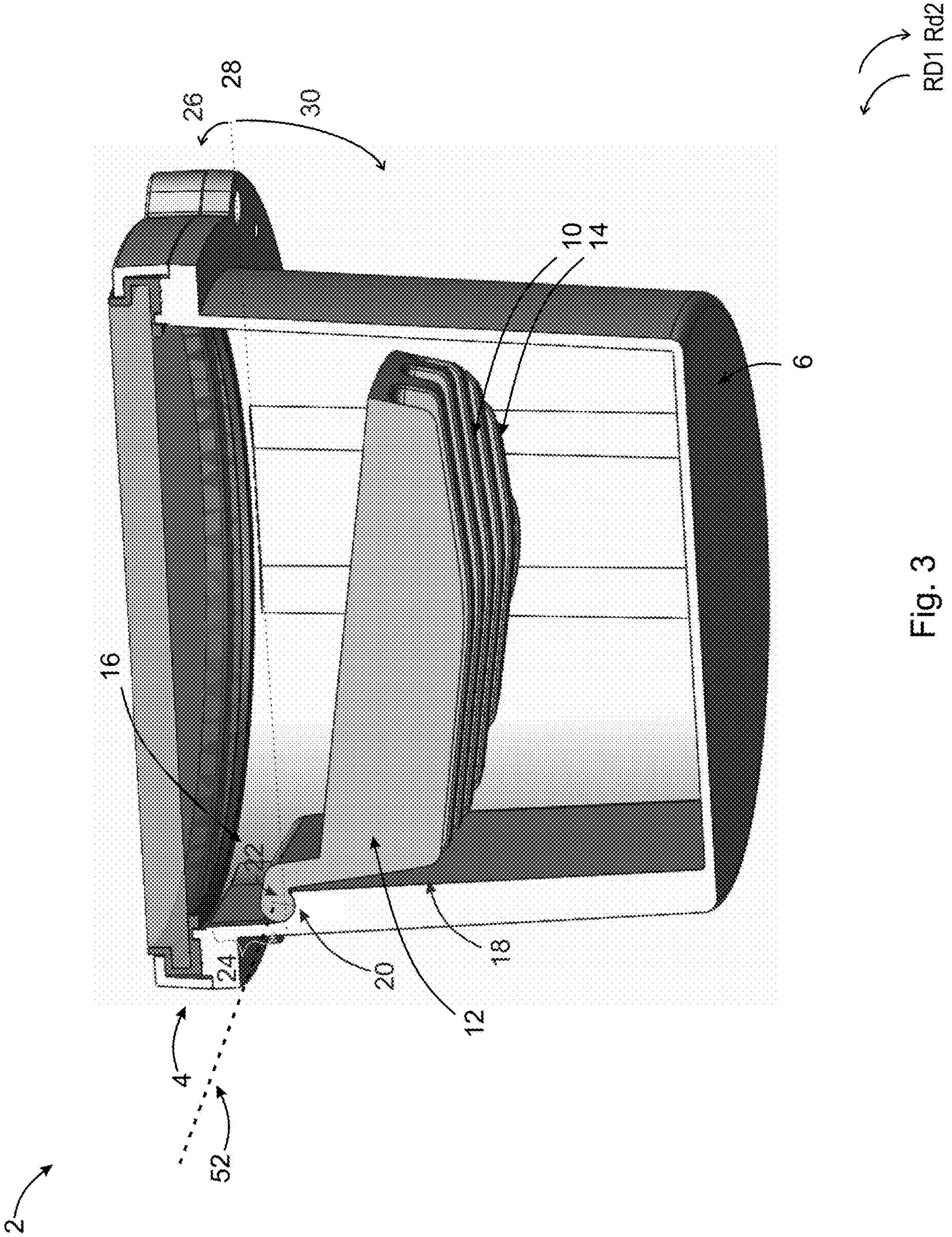
FIG. 3 is a cross-sectional view of a recessed luminaire according to aspects of the present disclosure.
Figure 3A:
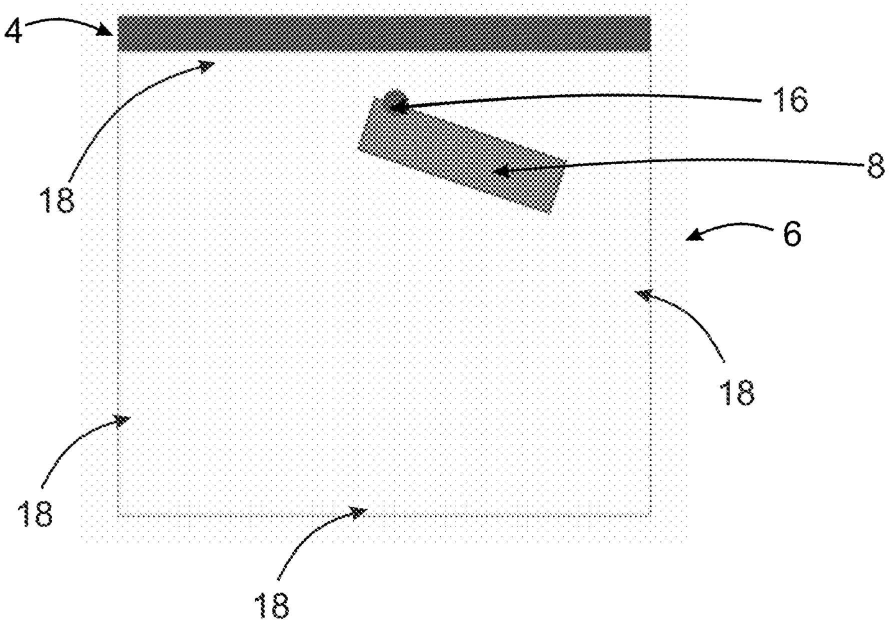
FIG. 3A is a cross-sectional view of a recessed luminaire according to aspects of the present disclosure.

Referring to FIG. 1, an in grade light fixture or a recessed luminaire 2 is shown. The recessed luminaire 2 has a cover 4 and housing 6. The cover 4 of the recessed luminaire 2 may include a lens such as a circular lens and may be made of glass. FIGS. 2, 3 and 3A show cross-sectional views of the recessed luminaire 2. Within the housing 6 of the recessed luminaire 2, there is a light subassembly 8 engaged with a thermally conductive body 10. The light subassembly 8 contains lighting elements which radiate light. These lighting elements may be, for example, a number of LEDs of any type or other light emitting diodes or the like.

The light subassembly 8 has a first end 53 and a second end 54. The first end 53 of the light subassembly 8 is pivotally secured to a pivot 16 arranged on, in, or proximate to an internal surface 18 of the housing 6 at a pivot point. The light subassembly 8 may connect directly to the pivot 16 (shown in FIGS. 2 and 3A) or may be connected to the pivot 16 by an intermediate object, such as the thermally conductive body 10 (shown in FIG. 6). FIG. 2 shows a pivot 16 comprising a first pivot component 20 integral to or removably secured to the internal surface 18 of the housing 6 and a second pivot component 22 integral to or removably secured to the light subassembly 8. The second pivot component 22 is non-rotatably connected to the light subassembly 8. The second pivot component 22 is arranged to rotate about the first pivot component 20 at the pivot point. The first pivot component 20 and the second pivot component 22 are arranged such that the second pivot component 22 rotates with respect to an imaginary plane 28 which passes through the first pivot component 20 and/or the second pivot component 22. The second pivot component 22 rotates about an axis 52 (shown in FIG. 3).

FIG. 3 shows a thermally conductive body 10 pivotally secured to a pivot 16 arranged on, in, or proximate to an internal surface 18 of the housing 6 at a pivot point. The pivot 16 comprises a first pivot component 20 integral to the internal surface 18 of the housing 6 and a second pivot component 22 integral to the thermally conductive body 10. The first pivot component 20 is a concave ledge arranged to receive the second pivot component 22 which is convex and sits flush with the first pivot component 20. The second pivot component 22 is arranged to rotate within the first pivot component 20 without releasing from the first pivot component 20. The first pivot component 20 and the second pivot component 22 may be connected by a partial friction fit where part of the first pivot component 20 and part of the second pivot component 22 make contact so that the force of friction operates between them.

Referring to FIGS. 2 and 3, the pivot 16 is located at a first distance 24 away from the cover 4 of the housing 6. The thermally conductive body 10 is arranged to rotate around the pivot point. The second pivot component 22 integrally connected to the thermally conductive body 10 is arranged to rotate a first rotational amount 26 in a first rotational direction RD1 with respect to a first imaginary horizontal plane 28 through the first pivot component 20 and substantially parallel with the cover 4 of the housing 6. The first rotational amount 26 ranges from approximately 0.5° to 6°. The first rotational amount 26 is preferably approximately 3°. The thermally conductive body 10 is arranged to rotate a second rotational amount 30 in a second rotational direction RD2 with respect to the first imaginary horizontal plane 28. The second rotational amount 30 ranges from approximately 10° to 20°. The second rotational amount 30 is preferably approximately 15°.

Rotation of the thermally conductive body 10 and the light subassembly 8 engaged with the thermally conductive body 10 about the pivot point in the RD2 direction is obstructed by the cover 4 of the housing. In an example, the light subassembly has a light cover 32 (shown in FIG. 2). The light cover 32 may be a decorative cover arranged over one or more light bulbs of the light subassembly 8 and may be clear or translucent to permit the passage of light. The light cover is bent in the X direction away from the cover 4 of the housing 6 on the end which will be closest to the housing 6 cover 4 when the light subassembly 8 is rotated along the RD1 direction. This permits additional rotation of the light subassembly 8 arranged on the thermally conductive body 10 in the RD1 direction. The pivot 16 is arranged on a first end 12, 53 of the thermally conductive body 10 or light subassembly 8 such that the length of the thermally conductive body 10 or the light subassembly 8 on the first end 12, 53 that is separated from the second end 14, 54 by the pivot 16 is short enough to not obstruct the rotation of the thermally conductive body 10 or the light subassembly 8 in the RD1 and RD2 directions.

With this configuration, the tilt location, being off center, allows the LED board (light subassembly 8) to be closer to the lens (in cover 4 of the recessed luminaire 2). This allows more light to exit the recessed luminaire 2 and not be cutoff by the side walls of the luminaire housing. This advantage is best seen when considering the position of the LED board when the board is parallel with the lens. In the off center tilt location as shown in FIGS. 2-3, the LED board is very close to the bottom of the lens when at the parallel angle. However, if the tilt location was in the center of the thermally conductive body, the position of the light subassembly would need to be much further away from the cover to allow a similar range of motion of the LED board. By configuring a pivot joint that puts the metal heatsink in direct contact with the metal external housing, a conduction heat transfer path is created. In an example, the pivot joint is designed in such a way that it is a shaft and a partial bore. The joint allows the heatsink to rotate inside of the housing, while still transferring heat through the joint through conduction. By adding this path the LED temperatures are greatly reduced compared to just relying on convection and radiation.

Referring to FIGS. 2 and 3, the thermally conductive body 10 is in thermal contact with the second pivot component 22 of the pivot 16, the second pivot component 22 is in thermal contact with the first pivot component 20, and the first pivot component 20 is in thermal contact with the internal surface 18 of the housing 6. Thus heat is dissipated away from the light subassembly 8 along the thermally conductive path from the thermally conductive body 10, through the pivot 16, and through the housing 6.

Figure 4:
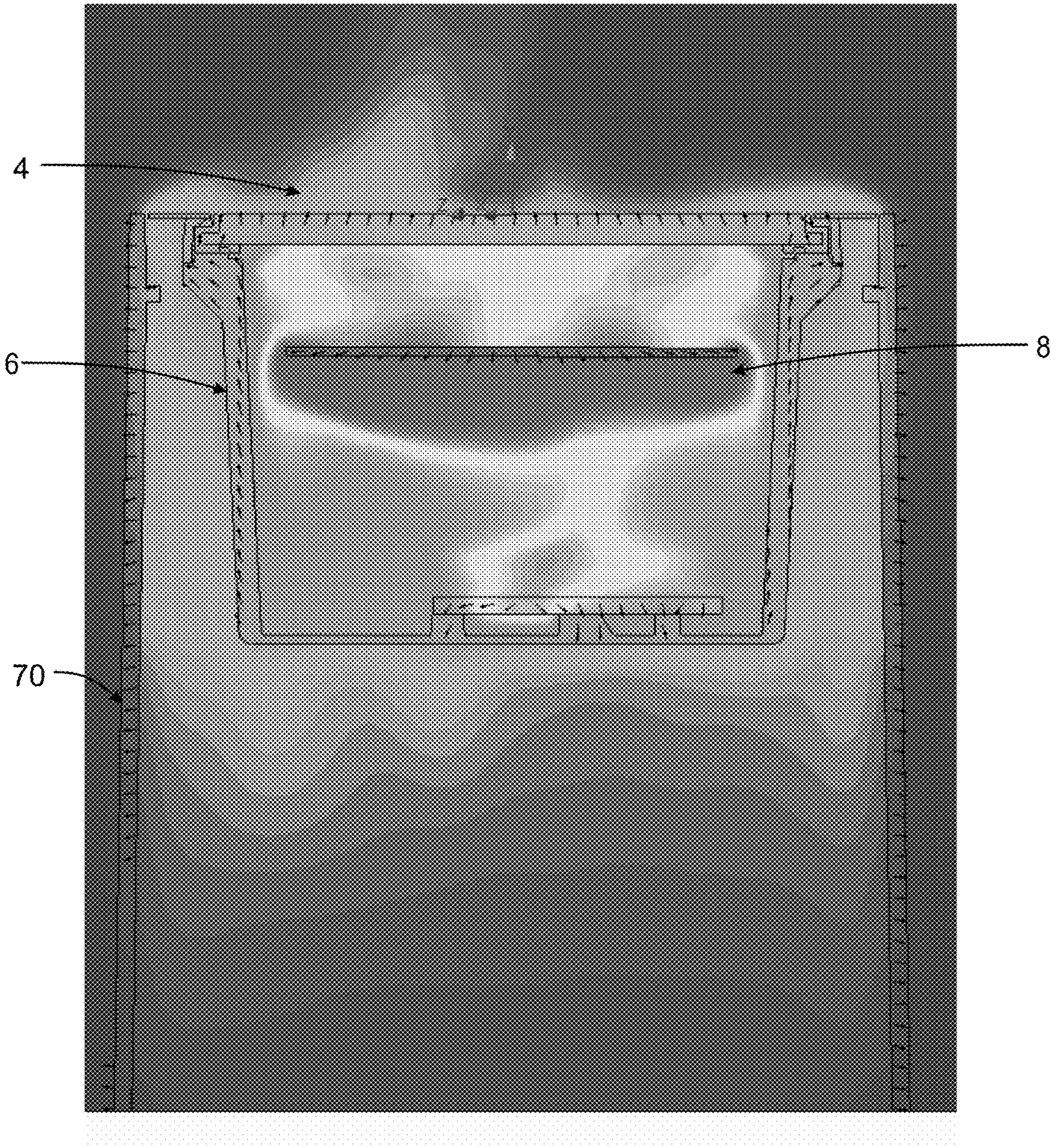
FIG. 4 is an illustration of heat dissipation from a recessed luminaire.

FIG. 4 shows heat flow or heat flux in luminaires without a thermally conductive path from the light subassembly 8 to the housing 6. Areas with different levels of heat are indicated in different shades of gray. The direction of heat flow is indicated by the direction of arrows. Heat flows by convection and radiation away from the light subassembly 8. The area 34 shaded in dark gray near the light subassembly 8 has greater heat and is adjacent to an area 36 of lighter gray, which indicates that heat from the dark gray area 34 does not dissipate as much to surrounding areas 36 which are much cooler and shaded in lighter gray.

Figure 5:
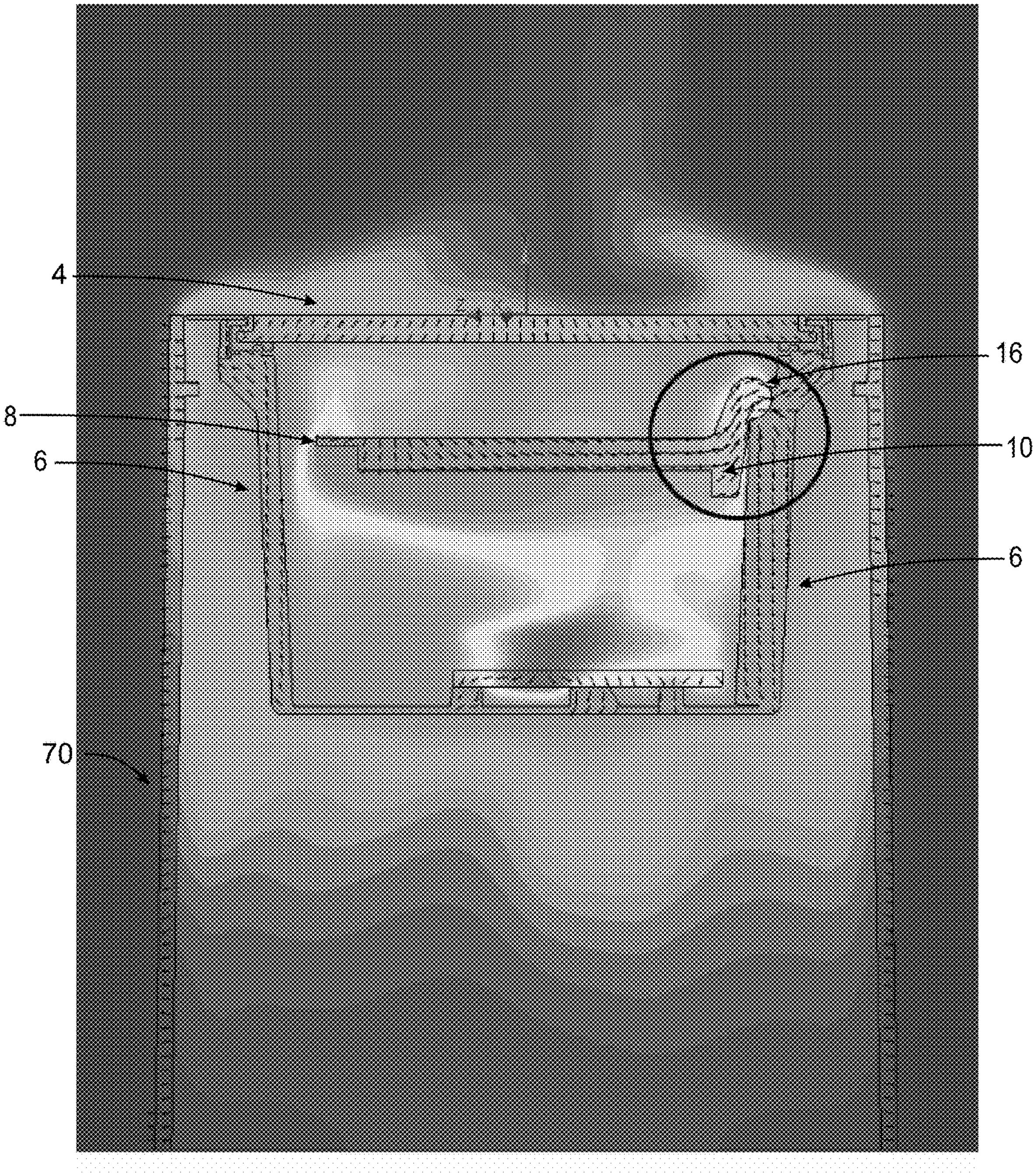
FIG. 5 is an illustration of heat dissipation from a recessed luminaire according to aspects of the present disclosure.
Figure 5A:
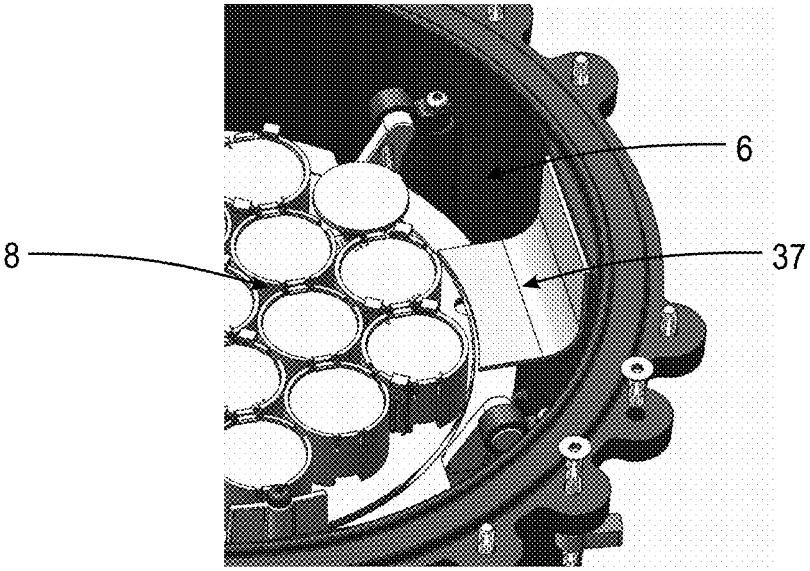
FIGS. 5A and 5B are illustrations of thermal straps according to aspects of the present disclosure.
Figure 5B:
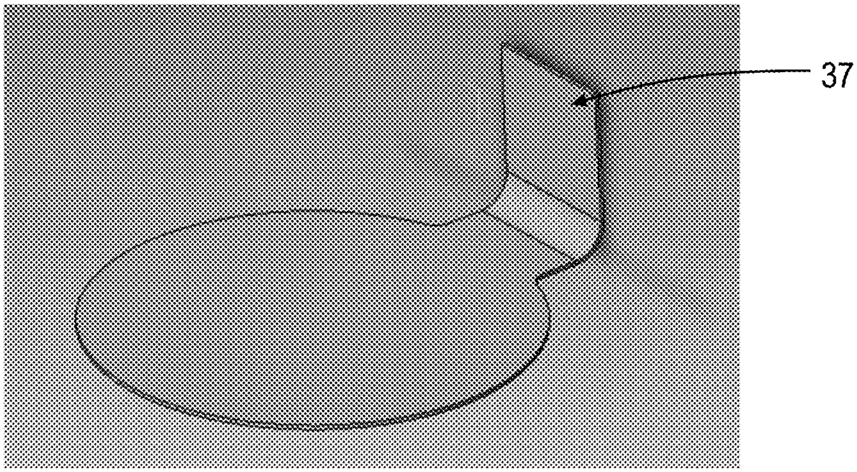

FIG. 5 shows heat flow indicated by arrows in luminaires with a thermally conductive path from the light subassembly 8 to the housing 6 according to the present disclosure. Areas with different levels of heat are indicated in different shades of gray, and the direction of heat flow is indicated by the direction of arrows. Heat flows from the lighting subassembly 8 and thermally conductive body 10, through the pivot 16, and through the housing 6 of the recessed luminaire 2. The lighting subassembly 8, thermally conductive body 10, the pivot 16, and the housing 6 are shaded in similar shades of gray. Heat flows from the light subassembly 8 to the thermally conductive body 10, through the pivot 16, and through the housing 6 which dissipates the heat. The flow of heat reduces the accumulation of heat on the lighting subassembly 8 or thermally conductive body 10. The thermally conductive body 10, pivot 16, and housing 6 may be made of highly thermally conductive materials such as metal. The amount of heat transfer along the conduction path is directly related to the material selected, the cross-sectional area of the path through the pivot, and the length of the path. In one example, the thermally conductive body 10 may have a plurality of fins 34 arranged to increase dispersion of heat from the thermally conductive body 10. The thermally conductive path may also be created using a thermal strap 37 (shown in FIGS. 5A and 5B) which is typically made from materials with very high in plane conductivity, such as copper and graphite. The thermal strap 37 may be incorporated into the housing 6 and thermally conductive body 10. The thermal strap 37 may be made of flexible material which can flex as the light subassembly 8 is rotated. The thermal strap 37 transfers heat via conduction from the light subassembly 8 to the housing 6. The thermal strap 37 may also extend completely under the light subassembly 8 (shown in FIG. 5B) so that heat goes from the light subassembly 8 through the light subassembly's thickness and directly into the strap 37 without having to go through other structural features first. This way heat moves into the thermal strap 37 and can move in plane very efficiently to the housing 6.

Figure 6:
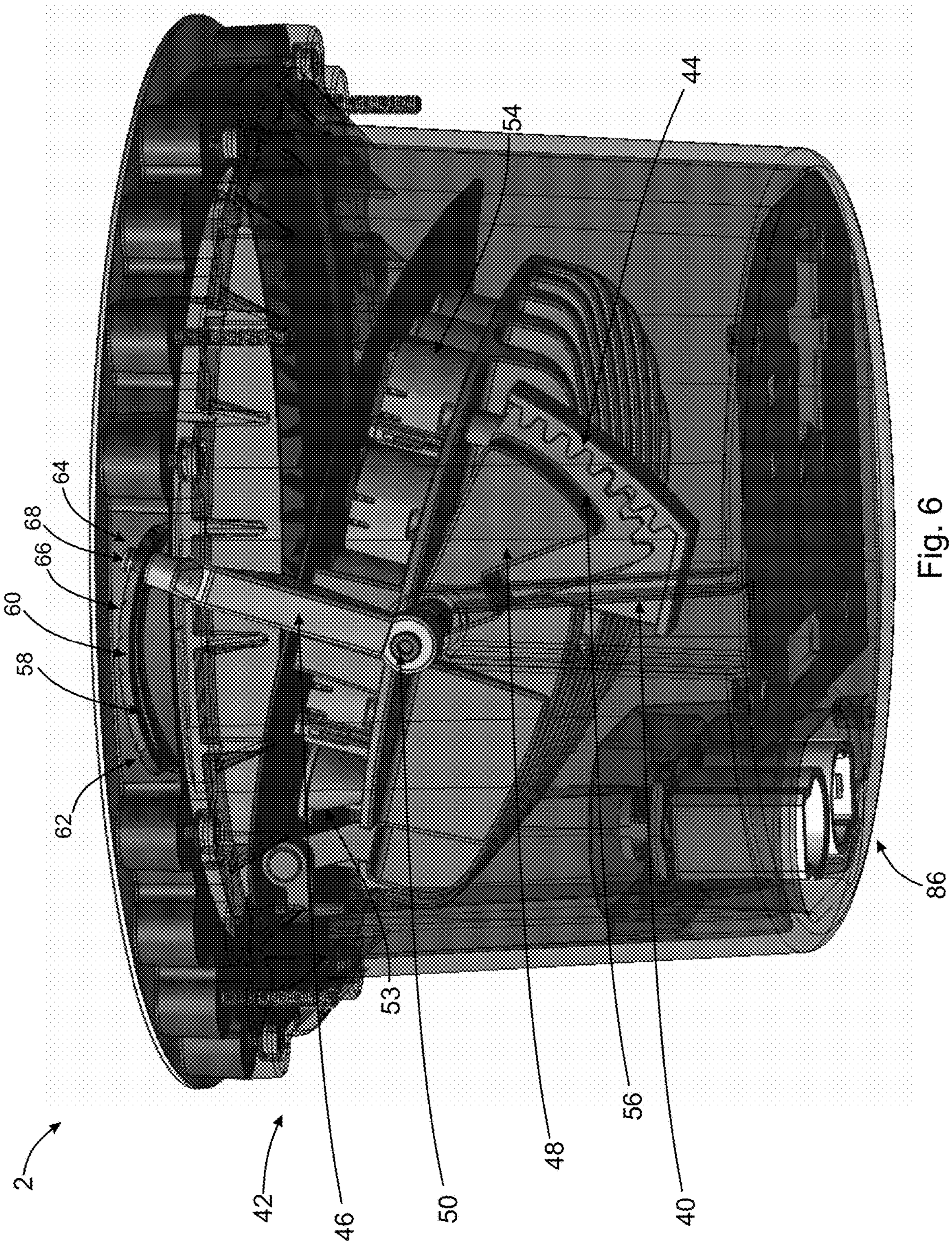
FIG. 6 is a cross-sectional view of a recessed luminaire according to aspects of the present disclosure.

The recessed luminaire 2 may further includes a lever 42 to change the angle of the light subassembly 8 and the direction that light shines from the recessed luminaire 2. As shown in FIG. 6, a gear plate 40 is non-rotatably secured to at least a portion of the thermally conductive body 10 inside the recessed luminaire 2. The gear plate 40 may be integral to the thermally conductive body 10. The gear plate 40 and the thermally conductive body 10 may be connected to each other directly. Alternatively, the gear plate 40 may be connected to one or more intermediate components which connect to the thermally conductive body 10. The gear plate 40 is non-rotatably secured to at least a portion of the thermally conductive body 10 which means that the gear plate 40 and the thermally conductive body 10 cannot rotate with respect to each other. The gear plate 40 has a first set of gear teeth 44 which are indentations on a toothed surface of the gear plate 40.

The recessed luminaire 2 also comprises a lever 42 comprising a first lever portion 46 and a second lever portion 48 which are non-rotatably connected. The first lever portion 46 and the second lever portion 48 are arranged to pivot about a lever pivot point 50. When the first lever portion 46 is rotated a first amount, the second lever portion 48 is rotated a second amount, where the second amount is in proportion to the first amount.

The first lever portion 46 has a first end and a second end. The first end extends outside the housing 6 of the recessed luminaire 2 and is accessible by a user during or after installation of the luminaire 2. The second end of the first lever portion 46 is pivotally connected to the second lever portion 48 at the lever pivot point 50. The first lever portion 46 has two substantially parallel sides which extend from the first end to the second end of the first lever portion 46 generally along the Y direction.

The lever pivot point 50 may be fixedly secured to the housing 6 on an exterior surface of the housing 6. The lever pivot point 50 may be located at a second distance away from the interior surface 18 of the housing 6 along the X axis direction and a third distance away from the pivot 16 which allows the thermally conductive body 10 to rotate along the X axis direction. In this way, the point at which the thermally conductive body 10 rotates and the point at which the first lever portion 46 rotates, the pivot point 50, are located at different distances in the X direction away from the interior of the housing.

The second lever portion 48 has a first end and a second end. The first end of the second lever portion 48 is connected to the first lever portion 46 at the lever pivot point 50. The second end of the second lever portion 48 has a second set of gear teeth 56 which are arranged on a toothed side of the second lever portion 48. At least a portion of the second set of gear teeth 56 of the second lever portion 48 are arranged to engage with at least a portion of the first set of gear teeth 44 of the gear plate 40.

In an example, the second lever portion 48 has two sides, a first side and a second side, which extend from the first end of the second lever portion 48 to the second end of the second lever portion 48 and are non-parallel such that the first end is narrower than the second end of the second lever portion 48. The toothed side of the second lever portion 48 extends from the first side to the second side of the second lever portion 48 and has a plurality of indentations which are of similar size and shape as the first set of gear teeth 44 of the gear plate 40 so as to allow at least a portion of the second set of gear teeth 56 of the second lever portion 48 to engage with at least a portion of the first set of gear teeth 44 of the gear plate 40. As an example, the toothed side of the second lever portion 48 is curved and convex. The second lever portion 48 has a first surface which faces the gear plate 40 in the direction of the Z axis and a second surface which faces the thermally conductive body 10 in the direction of the Z axis opposite the first surface.

In an example, the gear plate 40 has a first surface which faces away from the second lever portion 48 in the direction along the Z axis and a second surface which faces the second lever portion 48 in the direction along the Z axis opposite the first surface. The first surface of the gear plate 40 is adjacent to the second surface of the second lever portion 48. Along the second end of the gear plate 40 is a protrusion which extends in the direction of the Z axis. The protrusion has a toothed side which faces in the direction along the X axis which faces the lever pivot point 50. In an example, the toothed side is concave and has the first set of gear teeth 44. Alternatively, the gear plate 40 may have a convex side with the first set of gear teeth 44. The second lever portion 48 is arranged at a distance from the gear plate 40 in the direction along the Z axis so that at least a portion of the second set of gear teeth 56 engage with the first set of gear teeth 44. The gear plate 40 is arranged between the thermally conductive body 10 and the second lever portion 48, and the gear plate 40 is secured to the thermally conductive body 10.

The first end of the first lever portion 46 extends outside the housing 6 of the recessed luminaire 2 such that it is accessible to a user during installation of the light or after installation. The first end of the first lever portion 46 is arranged to move through a channel 58 of a securement plate 60 which is arranged on the exterior of the housing 6 of the recessed luminaire 2. The securement plate 60 is positioned outside the housing 6 and is positioned proximate to the cover 4 of the recessed luminaire 2. The securement plate 60 is arranged to receive the first end of the first lever portion 46 in its channel 58 and permit the first end of the first lever portion 46 to move within the channel 58. For example, the securement plate 60 may be positioned in a groove in the cover 4 of the recessed luminaire 2. The securement plate 60 has a channel 58 running from the first end of the securement plate 60 to the second end of the securement plate 60. The securement plate 60 is fixedly secured to the housing 6 or cover 4 of the recessed luminaire 2. The securement plate 60 is arched in the direction along the Y axis away from the lever pivot point 50.

The first end of the first lever portion 46 can be secured by a locking mechanism 68 so that it does not move further along the channel 58 of the securement plate 60, at the first end 62 of the channel 58, the second end 64 of the channel 58, or along an intermediate position 66 between the first end 62 and the second end 64 of the channel 58. The locking mechanism 68 may be a screw arranged to engage with a recess on the first end of the first lever portion 46 having an inner circumferential surface with a plurality of female recesses arranged to rotationally engage with a male helical thread on a threaded portion of the screw. The locking mechanism 68 may be any other mechanism which secures the first lever portion to the securement plate 60, including a nail, a clasp, a protruding tab, or any combination of these mechanisms or other known mechanisms.

Referring to FIGS. 7A through 7G, the recessed luminaire 2 may be installed using an outer box 70 which is inserted into a hole dug into the ground. The outer box 70 is used during installation of the recessed luminaire 2 to provide a cavity for the recessed luminaire 2 and for cables 72 providing an electrical connection for the luminaires 2. The outer box 70 has an interior surface, an exterior surface, and a cavity 78 surrounded by the interior surface. An installation cover 80 is arranged to cover the cavity 78 of the outer box 70. The installation cover 80 has a circular top wall with annular side walls which protrude along the periphery of the top wall. The outer box 70 has a lip which the annular side walls of the installation cover 80 contact to seal the cavity 78 of the outer box 70 from water, dirt, or other contaminants. The outer box 70 may be waterproof or it may not be waterproof and use various other ways to remove water, including drain holes. While illustrated as a cylinder shaped outer box 70 in FIGS. 7A through 7G, the outer box 70 and installation cover 80 may be of any shape.

The installation cover 80 has a plurality of connectors 82 arranged on an interior surface 74 of the circular top wall. The plurality of connectors 82 are accessible to electrical cables which are in the cavity 78 of the outer box 70. Before the recessed luminaire 2 is installed in the outer box 70, the electrical cable 72 which is used to provide power to the recessed luminaire 2 is attached to the installation cover 80 of the outer box 70 using one or more of the plurality of connectors 82. The electrical cable 72 can be managed during the process of installing the luminaires 2 so that the electrical cable 72 does not tangle, does not get pulled away from the outer box 70, and an appropriate length of cable 72 is saved to be connected to the recessed luminaire 2 which is to be installed in the outer box 70. This is particularly helpful when more than one recessed luminaire 2 is installed at once and multiple outer boxes 70 are installed. When electrical cable is drawn from one outer box 70 to another outer box 70 during the installation process, the connectors 82 on the installation covers 80 can be used to reserve an appropriate length of cable 72 for the recessed luminaires 2 before they are installed. The cable 72 ends are also protected from dirt, water, and other contaminants because they are connected to the connectors 82 and are not left loose in the outer box 72. The installation cover 80 may also be sealed to prevent dirt, water, and other contaminants from entering the outer box 70 and damaging the connectors 82.

The outer box 70 has a plurality of cable conduits 84 (shown in FIG. 7B) through which electric cables 72 may enter the outer box 70 or exit the outer box 70. When cables 72 enter or exit the outer box 70, the cable conduits 84 may be sealed to prevent dirt, water, or other contaminants from entering the outer box. The outer box 70 and the installation cover 80 may be secured by friction fit, a twist and lock mechanism, or any other mechanical connection means to seal the cavity 78 of the outer box 70 from dirt, water, or contaminants.

The connector 82 of the installation cover 80 may be molded into the installation cover 80. The connector 82 may comprise a first cable connector component arranged on an interior surface of the installation cover and a second cable connector component integrally connected to the cable. The first cable connector component may be integrally connected into the installation cover and may be molded into the installation cover. The connector 82, the first cable connector component, and/or the second cable connector component may be shaped asymmetrically around an axis going through the center of the surface on which the connector and cable meet when the cable 72 is connected to the connector 82. This asymmetry prevents the cable 72 from twisting while installed in the installation cover 80 or becoming removed from the installation cover 80.

The connectors 82 on the installation cover 80, the first cable connector component, and the second cable connector component are arranged to allow the cables 72 to be connected and disconnected from the installation cover 80. The recessed luminaire 2 has one or more luminaire cable connectors 86 (shown in FIGS. 2 and 6) into which one or more electrical cables 72 can be connected. The luminaire cable connectors 86 are cavities in the interior of the luminaire housing 6 which are accessible by openings on the exterior of the housing 6. The openings have cross-sections which are circular in shape and have protrusions outside the circle which make the shape of the cross-sections asymmetric. Once the recessed luminaire 2 is installed in the outer box 70, the recessed luminaire 2 is arranged to sit flush with the ground and portions of the outer box 70 are arranged to sit below the ground or sit flush with the ground.

Figure 7B:
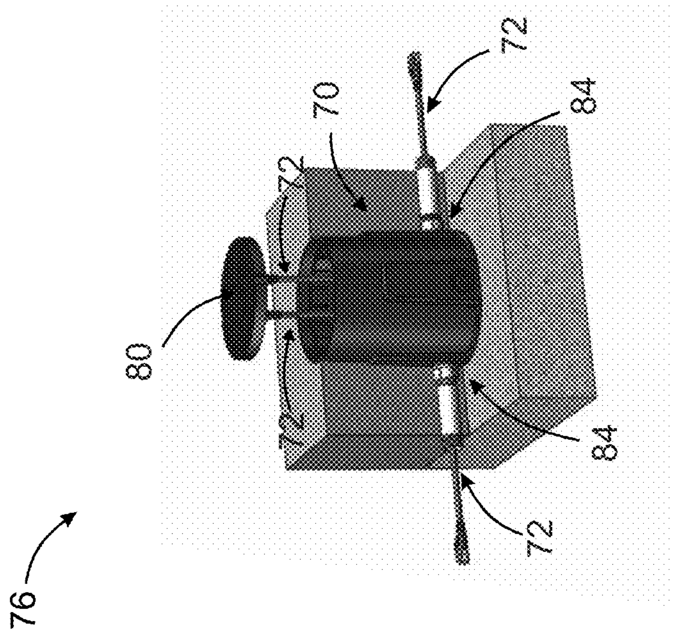
FIGS. 7A-7G are illustrations of an outer box and installation cover for a recessed luminaire according to aspects of the present disclosure.
Figure 7A:
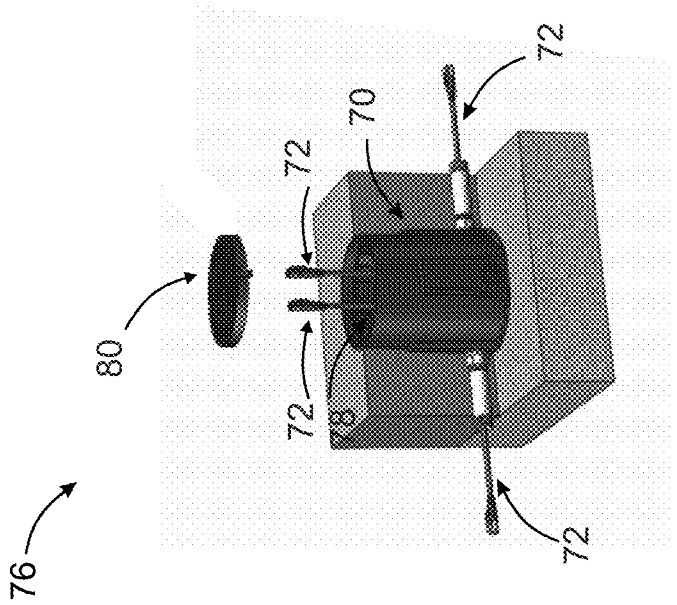
Figure 7C:
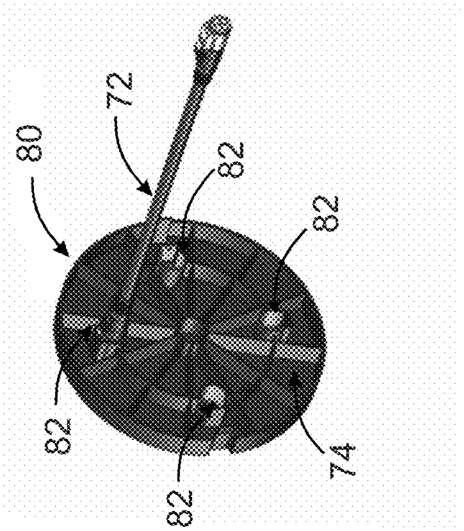
Figure 7E:
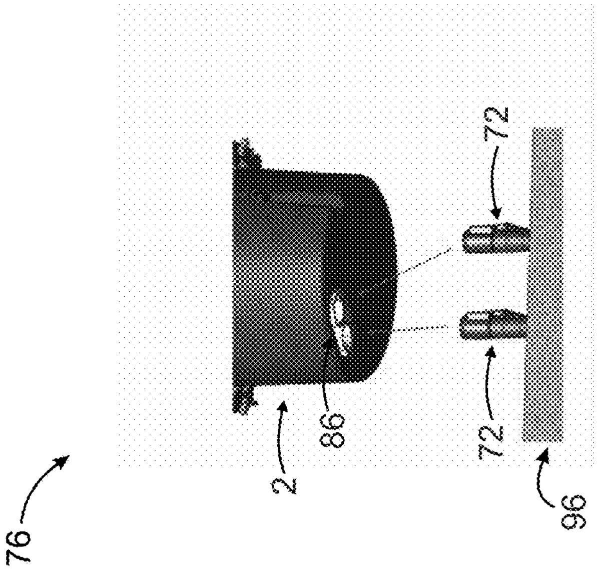
Figure 7F:
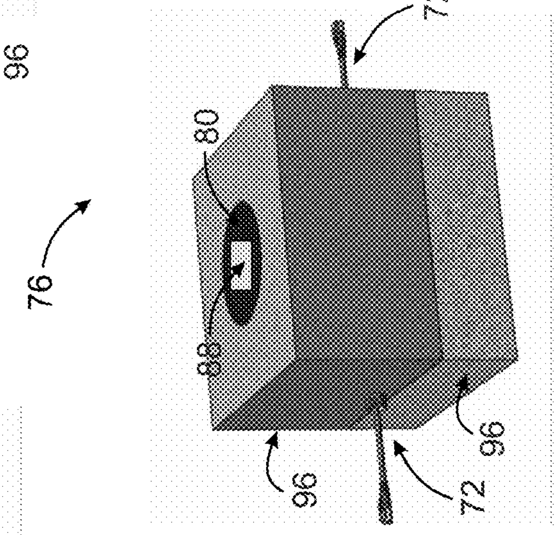
Figure 7D:
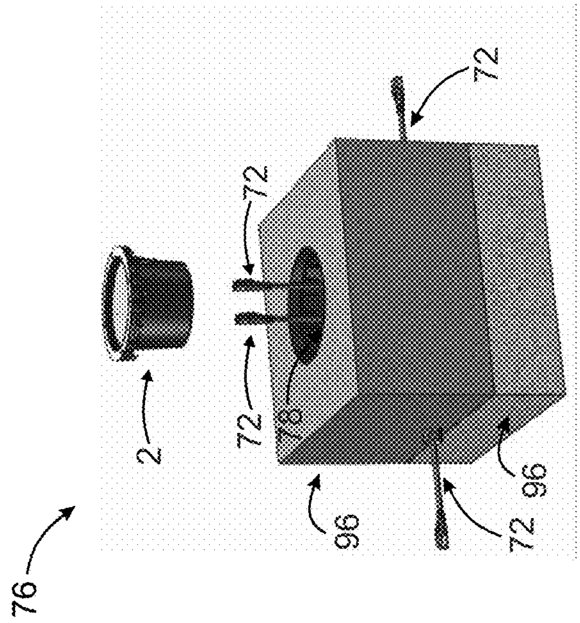

The outer box 70 may further include an electric connector bridge 88, shown schematically in FIG. 7F, arranged to electrically connect the cables 72 so that each installation cover 80 with cables 72 can be electrically connected in a linear series or daisy chained so that during installation a single power source can provide power to the luminaires 2. An electric power source can be selected from a battery, super capacitor, mains power source, or any other source capable of providing electric power or charge through the connectors 82 to the cables 72.

Figure 7G:
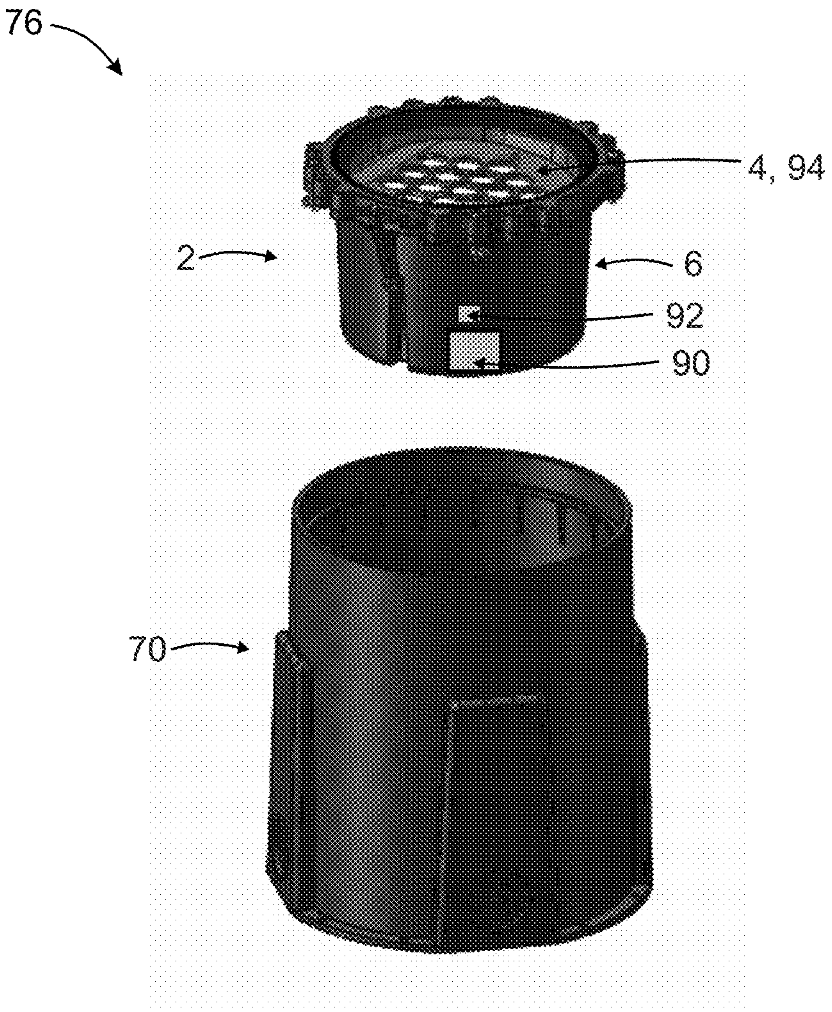

As shown in FIG. 7G, the in grade light fixture 2 which is installed below the ground 96 (shown in FIGS. 7D-7F) may further include a dehumidifier 90. The dehumidifier 90 may be used to set a humidity range inside a product and vent to the outside environment. The dehumidifier 90 may allow pressure to equalize and reduce stress on seals. The dehumidifier 90 may also prevent the internal humidity from reaching 0% RH, which can be prevented, for example, by using a feedback loop to maintain an ideal humidity range. This is in contrast the use of desiccants as dehumidifiers, where the humidity can go to 0% RH which can dry out internal electronics and cause damage. As an example, the dehumidifier 90 may utilize a regenerating desiccant. The dehumidifier 90 may be installed in the housing 6 of the recessed luminaire 2 such that the dehumidifier 90 has one surface on the interior of the housing 6 and one surface on the exterior of the housing 6. The dehumidifier 90 may be an electromechanical dehumidifier having a breathable membrane and a radial seal which provides a seal while also providing pressure equalization. The dehumidifier 90 may include a desiccant which absorbs moisture from the recessed luminaire 2. The desiccant can also release moisture to the atmosphere through a first vent or pump which is opened and closed to the outside environment. An additional breathable vent may provide pressure equalization when the first vent or pump is opened and provide a barrier from dirt, water, or other contaminants entering the recessed luminaire 2. A humidity sensor 92 may be arranged, on, within, or in proximity to the housing 6 and may be configured to provide a feedback loop to the dehumidifier 90 for maintaining internal relative humidity.

Figure 8:
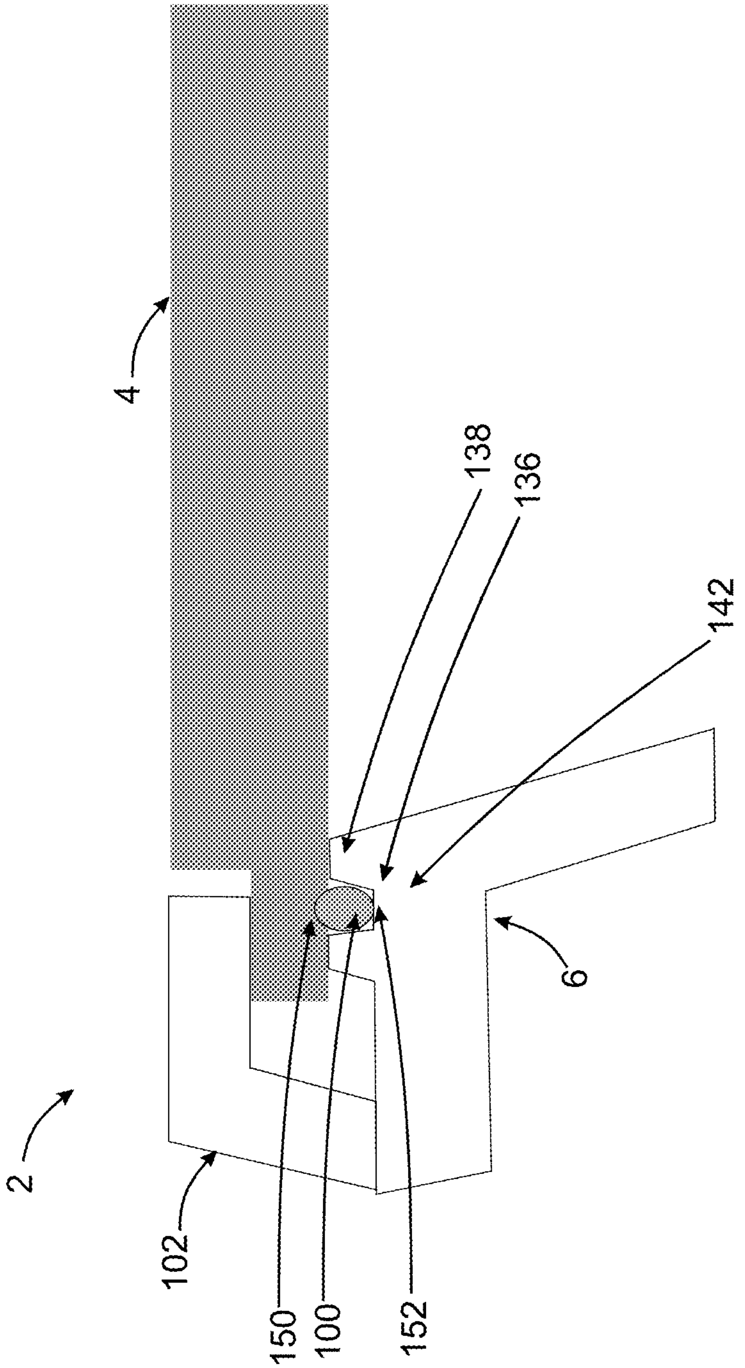
FIG. 8 is a cross-sectional view of a recessed luminaire and gasket according to aspects of the present disclosure.

Referring to FIG. 8, the in grade luminaire 2 has a gasket 100 between the cover 4 of the recessed luminaire 2 and the housing 6 of the recessed luminaire. The gasket 100 provides strength to the cover 4 from forces on the cover 4 of the recessed luminaire 2. For example, a recessed luminaire 2 which is in the ground may have to withstand the weight of objects on the luminaire, such as people and/or vehicles. In an example shown in FIG. 8, the gasket 100 has a first surface 150 which is in contact with the cover 4 of the recessed luminaire 2. The gasket 100 has a second surface 152 which is in contact with the housing 6 of the luminaire 2. The housing 6 of the luminaire includes a first portion 138 having a first height and a second portion 142 having a second height. The second portion 142 of the housing 6 has an indentation 136, and the second height is less than the first height. The first portion 138 of the housing 6 and the second portion 142 of the housing 6 are adjacent to the gasket 100. The housing 6 limits how much the gasket 100 can be compressed when force is applied to the cover 4 of the recessed luminaire 2. The gasket 100 provides a seal between the cover 4 and the housing 6 and may include a c-channel style gasket, an o-ring, or a dispensed adhesive seal. The first portion 138 of the housing 6 may be integral to the housing or may not be integral to the housing. In an example, the first portion 138 of the housing 6 is not integral to the housing 6 and is a separate component that provides the height difference. The stiffness of the first portion 138 of the housing 6 is much greater than that of the gasket 100. The first portion 138 should be able to withstand the force generated by the weight of a vehicle or load to the cover 4. If the first portion 138 is not sufficiently stiff, it too would deflect and the force would be transferred to the gasket 100. In an example, the first portion 138 is made of metal or has metal components.

Figure 9:
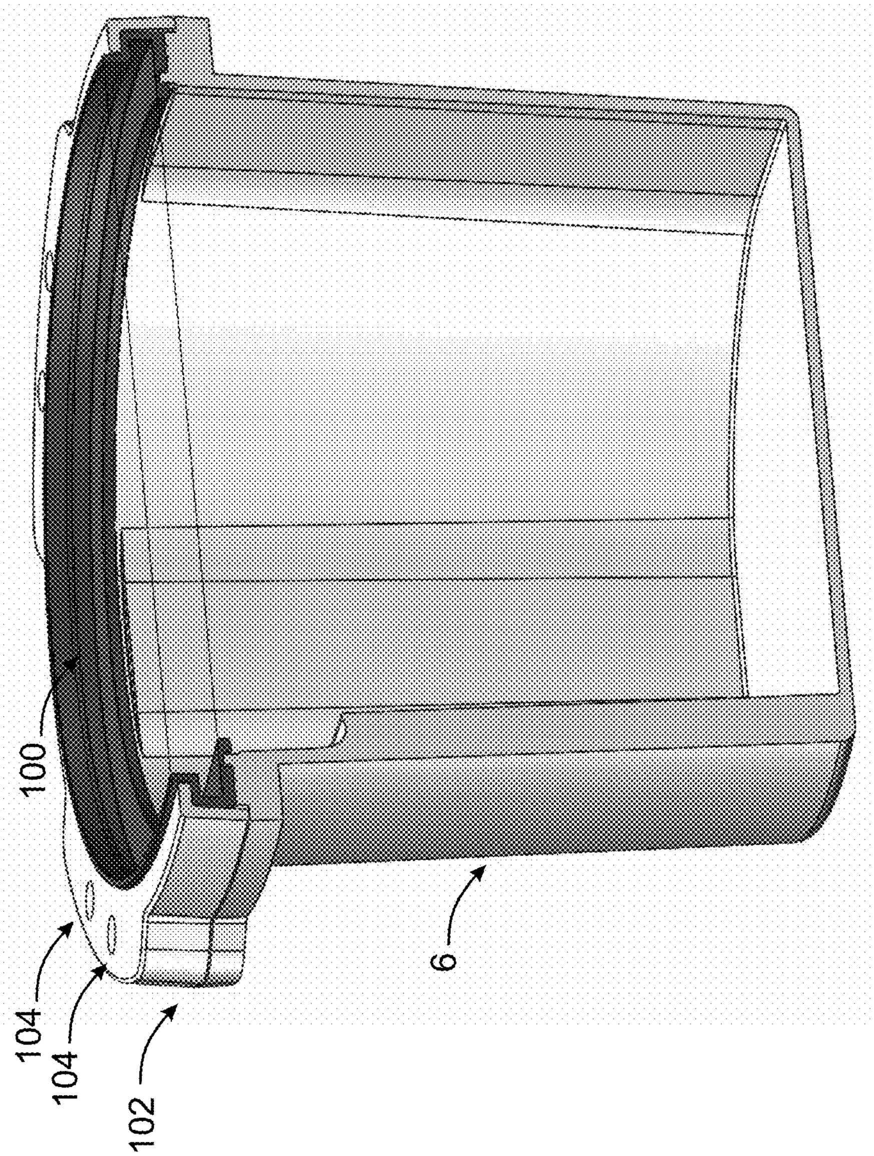
FIG. 9 is a cross-sectional view of a recessed luminaire according to aspects of the present disclosure.
Figure 10:
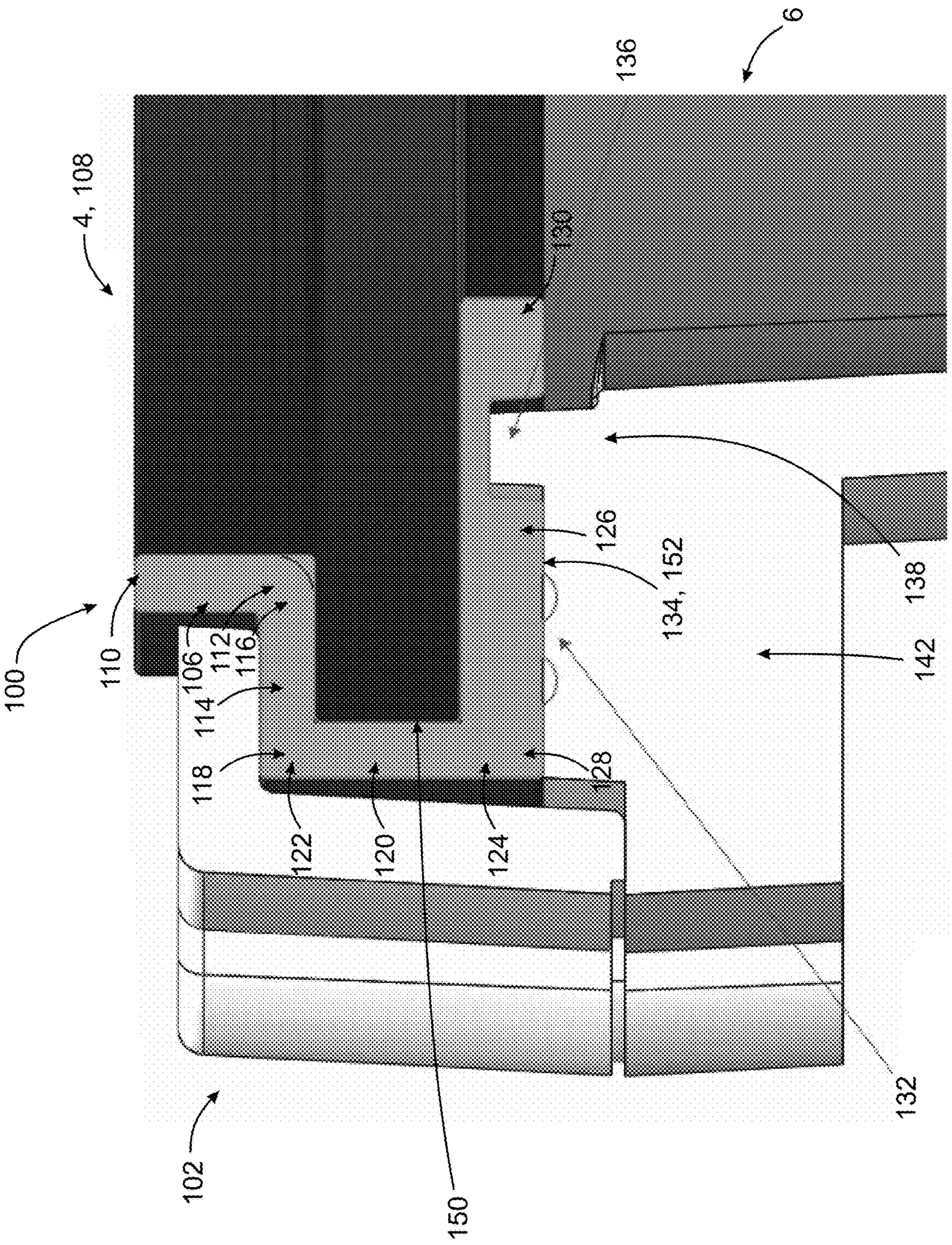
FIG. 10 is a cross-sectional view of a recessed luminaire and gasket according to aspects of the present disclosure.

In an example shown in FIG. 9, the housing 6 of the recessed luminaire 2 is secured to the gasket 100 by a bezel clamp 102 which may be tightened by screws inserted into screw holes 104. The cover 4 of the recessed luminaire 2 comprises a circular lens inserted into a c-shaped channel of the gasket. FIG. 10 is a cross-sectional view of an exemplary cover 4 of the recessed luminaire 2. The gasket 100 has a first vertical component 106 substantially perpendicular to a reference surface 108 which is the top surface of the cover 4 of the recessed luminaire 2. The first vertical component 106 has a first end 110 and a second end 112. A first horizontal component 114 of the gasket 100 is substantially parallel to the reference surface 108. The first horizontal component 114 has a third end 116 and a fourth end 118, where the third end 116 is integrally connected to the second end 112 of the first vertical component 106. A second vertical component 120 of the gasket 100 is substantially perpendicular to the reference surface 108. The second vertical portion 120 component has a fifth end 122 and a sixth end 124, where the fifth end 122 is integrally connected to the fourth end 118 of the first horizontal component 114. The gasket 100 also has a second horizontal component 126 substantially parallel to the reference surface 108. The second horizontal portion 126 has a seventh end 128 and an eight end 130, where the seventh end 128 is integrally connected to the sixth end 124 of the second vertical component 120. The first vertical component 106, the first horizontal component 114, the second vertical component 120, and the second horizontal component 126 are annular about and arranged about a cover 4 of the recessed luminaire 2. The first vertical component 106, the first horizontal component 114, the second vertical component 120, and the second horizontal component 126 each have a surface which contacts the cover 4, and the cover 4 is inserted in the c-shaped channel created by the first horizontal component 114, the second vertical component 120 and the second horizontal component 126. The cover 4 may comprise a clear or translucent lens and an outer casing for the lens. In one example, the gasket 100 further comprises sealing bumps 132 arranged on a first external surface 134 of the second horizontal component 126 of the gasket 100. In one example, the gasket 100 further comprises an indentation 136 on the second horizontal component 126. The housing comprises a first portion 138 having a first height and a second portion 142 having a second height, where the second height is less than the first height. The first portion 138 of the housing 6 and the second portion 142 of the housing 6 are adjacent to the gasket 100. The protrusion created by the first portion 138 of the housing 6 into the indentation 136 in the gasket 100 limits the height that the gasket 100 can compress. This compression limiting feature protects the seal from being over compressed by force applied to the top surface of the cover 4.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above.

What is claimed is:

1. An outer box assembly for the installation of a luminaire, the outer box assembly comprising:

an outer box having a cavity, the outer box arranged to receive the luminaire;

an installation cover having an interior surface, the installation cover arranged to cover the cavity of the outer box prior to installation of the luminaire in the outer box, wherein the interior surface faces the cavity of the outer box; and one or more connectors arranged on the interior surface of the installation cover, wherein prior to installation of the luminaire in the outer box, the one or more connectors are arranged to receive one or more cables and the installation cover is engaged to cover the cavity of the outer box, and wherein during installation of the luminaire in the outer box, the one or more cables are disengaged from the installation cover and coupled to the luminaire to deliver power to the luminaire.

2. The outer box assembly of claim 1, wherein an end of the cable is arranged to connect to the installation cover at the one or more connectors or to the luminaire at one or more luminaire cable connectors of the luminaire.

3. The outer box assembly of claim 1, further comprising an electric bridge arranged to provide electrical connectivity to the one or more connectors on the installation cover.

4. The outer box assembly of claim 1, wherein the luminaire arranged within the cavity of the outer box is arranged to sit flush with the ground.

5. The outer box assembly of claim 1, wherein the installation cover is arranged to seal the cavity of the outer box from dirt and moisture.

6. The outer box assembly of claim 1, wherein the luminaire received by the outer box comprises:

a housing having an internal surface;

a light subassembly having a first end and a second end, wherein the first end is pivotally secured to a pivot arranged on, in, or proximate to the internal surface of the housing; and a thermally conductive body engaged with the light subassembly, the thermally conductive body having a first end and a second end, wherein the thermally conductive body is in thermal contact with the internal surface of the housing.

7. The outer box assembly of claim 6, wherein the luminaire received by the outer box further comprises: a cover of the housing, wherein the pivot is located at a first distance away from the cover of the housing, wherein the light subassembly engaged with a thermally conductive body rotates a first rotational amount in a first rotational direction (RD1) with respect to a first imaginary horizontal plane through the pivot and substantially parallel with the cover of the housing and a second rotational amount in a second rotational direction (RD2) with respect to the first imaginary horizontal plane.

8. The outer box assembly of claim 1, wherein the luminaire received by the outer box comprises: a gasket, comprising:

a first surface in contact with a cover of the luminaire;

a second surface in contact with a housing of the luminaire, wherein the housing comprises a first portion having a first height and a second portion having a second height, wherein the second height is less than the first height, wherein the first portion of the housing and the second portion of the housing are adjacent to the gasket, and wherein the second portion of the housing or the second surface of the gasket have an indentation.

9. The outer box assembly of claim 8, wherein the gasket further comprises: sealing bumps arranged on an external surface of the gasket.

10. The outer box assembly of claim 1, wherein the luminaire received by the outer box comprises:

a housing includes a glass cover, wherein the luminaire is arranged to be installed below ground;

a dehumidifier having a first surface on the interior of the housing and a second surface on the exterior of the housing; and a humidity sensor arranged on, within, or in proximity to the housing, wherein the humidity sensor is configured to provide a feedback loop to the dehumidifier.

* * * * *